United States Patent
Isoda

(10) Patent No.: US 8,248,653 B2
(45) Date of Patent: Aug. 21, 2012

(54) INFORMATION PROCESSING APPARATUS, PRINT CONTROL METHOD, AND COMPUTER PROGRAM

(75) Inventor: Takashi Isoda, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1101 days.

(21) Appl. No.: 12/140,242

(22) Filed: Jun. 16, 2008

(65) Prior Publication Data

US 2009/0002755 A1 Jan. 1, 2009

(30) Foreign Application Priority Data

Jun. 18, 2007 (JP) ................................. 2007-160495

(51) Int. Cl.
*G06K 15/00* (2006.01)
*G06F 17/24* (2006.01)

(52) U.S. Cl. ...... 358/1.18; 358/1.15; 358/403; 715/252; 715/204; 715/243

(58) Field of Classification Search .................. 358/1.15, 358/403, 1.18; 709/223; 715/252, 204, 243
See application file for complete search history.

(56) References Cited

U.S. PATENT DOCUMENTS

| | | | | |
|---|---|---|---|---|
| 2002/0140982 | A1* | 10/2002 | Nitta et al. | 358/1.18 |
| 2003/0223089 | A1* | 12/2003 | Laursen et al. | 358/1.15 |
| 2004/0073682 | A1* | 4/2004 | Ball et al. | 709/227 |
| 2006/0203294 | A1* | 9/2006 | Makino | 358/400 |

FOREIGN PATENT DOCUMENTS

| | | |
|---|---|---|
| JP | 11-254782 | 9/1999 |
| JP | 2006-115170 A | 4/2006 |
| JP | 2006-139534 A | 6/2006 |
| JP | 2007-148845 A | 6/2007 |

* cited by examiner

*Primary Examiner* — King Poon
*Assistant Examiner* — Lawrence Willis
(74) *Attorney, Agent, or Firm* — Fitzpatrick, Cella, Harper & Scinto

(57) ABSTRACT

From contents of each record of variable data, a post-printing process to the record is predetermined. A time to start the post-printing process is read out of a distribution route running information table. Based on the time, a post-printing process start time (departure time of a truck) is decided every record. A print start time is decided every record in consideration of the decided post-printing process start time (departure time of the truck) and the printing of the record is started at this time.

8 Claims, 17 Drawing Sheets

401

<ZIP CODE>
ATTRIBUTE INFORMATION (GOTHIC STYLE, 10-POINT, LINE START POSITION 300, 700)
<ADDRESS>
ATTRIBUTE INFORMATION (GOTHIC STYLE, 10-POINT, BLOCK START POSITION 300, 900)
<NAME>
ATTRIBUTE INFORMATION (GOTHIC STYLE, 10-POINT, LINE START POSITION 300, 1100)

EXCHANGE REPORT
ADVISING THE LATEST EXCHANGE INFORMATION AND FUTURE TRANSITION FORECAST.

PRESENT EXCHANGE RATE          <EXCHANGE RATE>
LONG-RANGE FORECAST            <LONG-RANGE FORECAST>

SHORT-RANGE FORECAST           <SHORT-RANGE FORECAST>

FIG. 5B

<EXCHANGE RATE>
ATTRIBUTE INFORMATION (GOTHIC STYLE, 10-POINT, BLOCK START POSITION 200, 700)
<LONG-RANGE FORECAST>
ATTRIBUTE INFORMATION (GOTHIC STYLE, 10-POINT, BLOCK START POSITION 200, POSSIBLE)
<SHORT-RANGE FORECAST>
ATTRIBUTE INFORMATION (GOTHIC STYLE, 10-POINT, BLOCK START POSITION 200, POSSIBLE)

| RECORD NO. | VARIABLE DATA NAME | VARIABLE DATA ZIP CODE | VARIABLE DATA ADDRESS |
|---|---|---|---|
| 1 | ICHIRO TANAKA | 004-0021 | ..., SAPPORO-SHI, HOKKAIDO |
| 2 | JIRO NAKAMURA | 891-1107 | ..., KAGOSHIMA-SHI, KAGOSHIMA-KEN |
| 3 | SHIRO SUZUKI | 245-0016 | ..., YOKOHAMA-SHI, KANAGAWA-KEN |
| 4 | GORO YAMADA | 880-0803 | ..., MIYAZAKI-SHI, MIYAZAKI-KEN |
| 5 | ROKURO SATO | 604-0847 | ..., KYOTO-SHI, KYOTO-FU |
| 6 | SHICHIRO HAYASHI | 087-0014 | ..., NEMURO-SHI, HOKKAIDO |
| 7 | HACHIRO YOSHIDA | 140-0000 | ..., SHINAGAWA, TOKYO-TO |
|  |  |  |  |
| N-1 | KURO INSATSU | 536-0002 | ..., OSAKA-SHI, OSAKA-FU |
| N | JURO PRINT | 814-0004 | ..., FUKUOKA-SHI, FUKUOKA-KEN |

FIG. 7
701

| VARIABLE DATA EXCHANGE RATE | VARIABLE DATA LONG-RANGE FORECAST | VARIABLE DATA SHORT-RANGE FORECAST |
|---|---|---|
| 116.5 | <LONG-RANGE FORECAST> IT IS FORECASTED THAT DOLLARS WILL CHANGE IN A WEAK STATE IN A HALF YEAR DUE TO A REDUCTION IN DEMAND FOR HOUSING IN U.S.A. | <SHORT-RANGE FORECAST> IT IS FORECASTED THAT ALTHOUGH DOLLARS FALL TEMPORARILY DUE TO A RESULT OF A MIDTERM ELECTION OF THE SENATE, THEY WILL BE RECOVERED SOON BECAUSE IT HAS BEEN ANTICIPATED BY THE LEADING SPECULATORS. |

FIG. 8
801

| 〒 | 894-1107 |
|---|---|
| ADDRESS | ..., KAGOSHIMA-SHI, KAGOSHIMA-KEN |
| NAME | JIRO NAKAMURA |

FIG. 9

EXCHANGE REPORT

ADVISING THE LATEST EXCHANGE INFORMATION AND FUTURE TRANSITION FORECAST.

PRESENT EXCHANGE RATE 116.5

LONG-RANGE FORECAST — IT IS FORECASTED THAT DOLLARS WILL CHANGE IN A WEAK STATE IN A HALF YEAR DUE TO A REDUCTION IN DEMAND FOR HOUSING IN U.S.A.

SHORT-RANGE FORECAST — IT IS FORECASTED THAT ALTHOUGH DOLLARS FALL TEMPORARILY DUE TO A RESULT OF A MIDTERM ELECTION OF THE SENATE, THEY WILL BE RECOVERED SOON BECAUSE IT HAS BEEN ANTICIPATED BY THE LEADING SPECULATORS.

| MANUSCRIPT INPUT DATA | |
|---|---|
| DELIVERY COMPLETION TIME | 2006/11/24 23:30 |
| VARIABLE DATA DECISION DELAY REQUEST | ON |
| TEMPLATE DATA | www.✲✲✲/template01.asp |
| VARIABLE DATA 1 | www.✲✲✲/variable01.asp |
| VARIABLE DATA 2 | www.✲✲✲/variable02.asp |

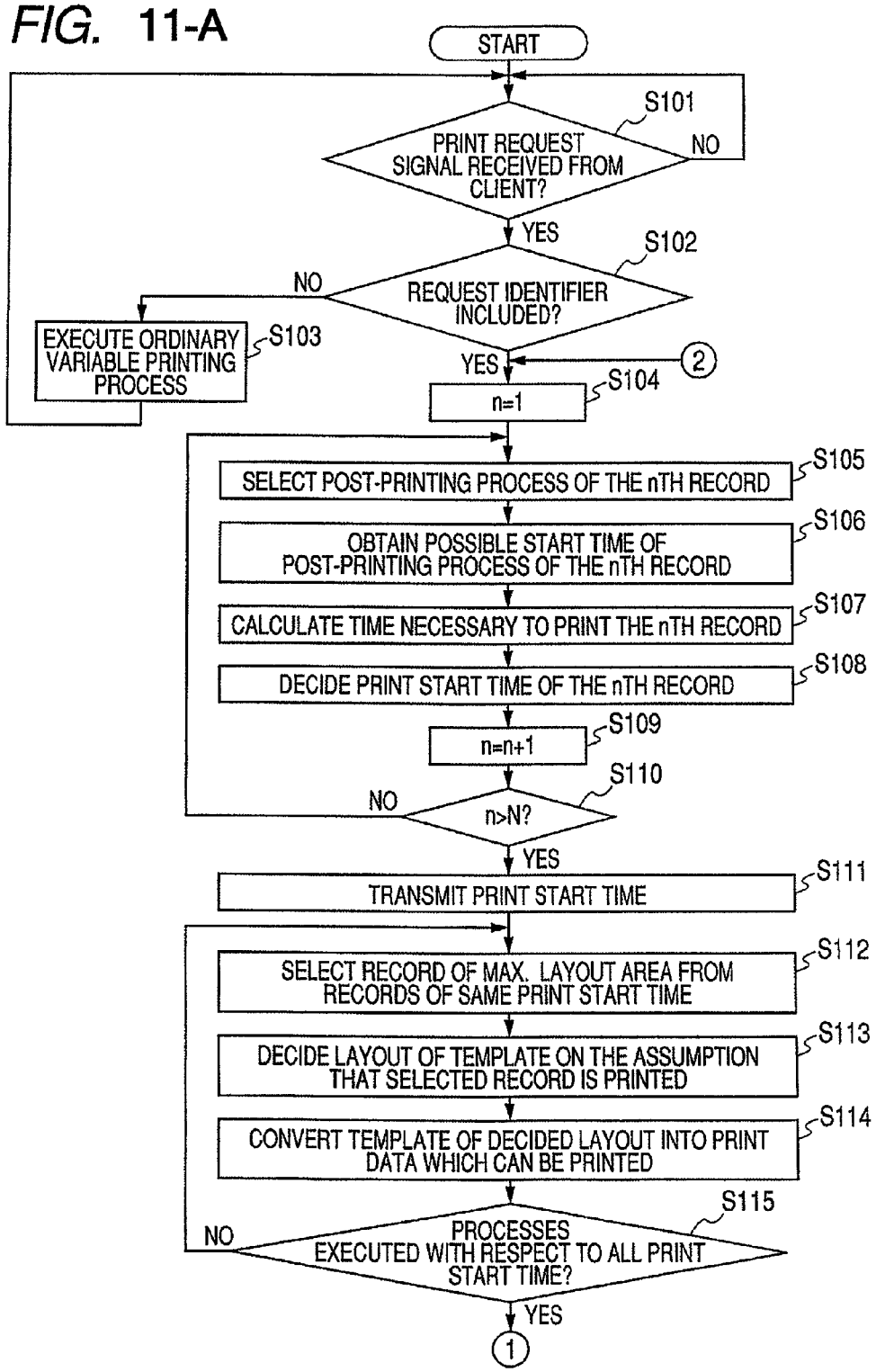
FIG. 11-A

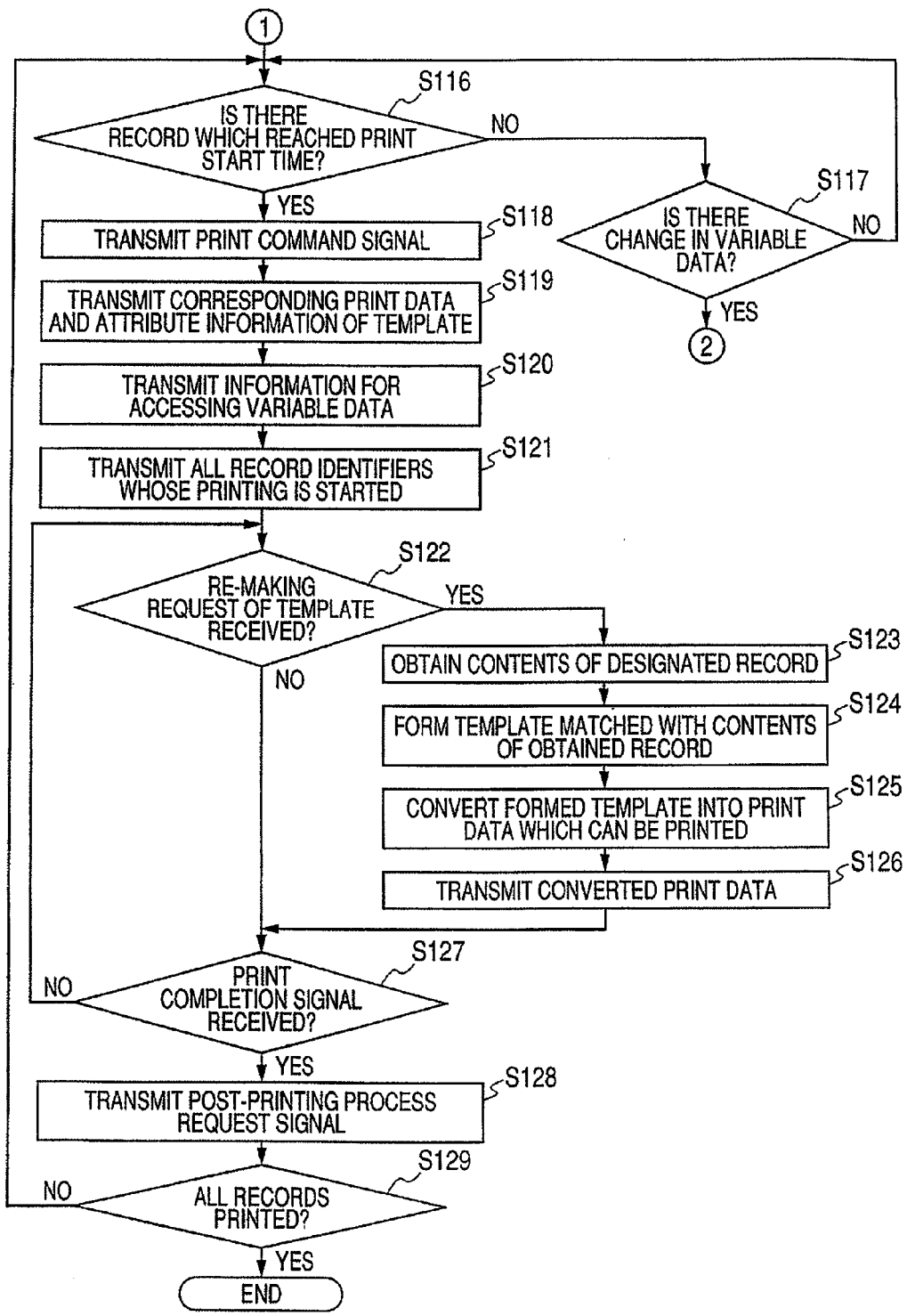
FIG. 11-B

| REGION | ZIP CODE |
|---|---|
| HOKKAIDO | 004, 087, ... |
| KANTO | 140, 245, ... |
| KINKI | 536, 604, ... |
| KYUSHU | 880, 891, 814, ... |

| DESTINATION | DEPARTURE TIME | SCHEDULED ARRIVAL TIME |
|---|---|---|
| HOKKAIDO | 2006/11/24 1:00<br>2006/11/24 12:00<br>2006/11/24 21:00 | 2006/11/24 10:00<br>2006/11/24 19:00<br>2006/11/25 6:00 |
| KANTO | 2006/11/24 17:00<br>2006/11/24 19:00<br>2006/11/24 22:00 | 2006/11/24 18:00<br>2006/11/24 20:00<br>2006/11/24 23:00 |
| KINKI | 2006/11/24 11:00<br>2006/11/24 17:00<br>2006/11/24 22:00 | 2006/11/24 16:00<br>2006/11/24 22:00<br>2006/11/25 3:00 |
| KYUSHU | 2006/11/24 3:00<br>2006/11/24 13:00<br>2006/11/24 21:00 | 2006/11/24 13:00<br>2006/11/24 23:00<br>2006/11/25 7:00 |

FIG. 15

| RECORD IDENTIFIER | 1, 5, 6 |
|---|---|
| TEMPLATE CONVERSION DATA 1 | (ACTUAL PRINT DATA) |
| <ZIP CODE> | ATTRIBUTE INFORMATION (GOTHIC STYLE, 10-POINT, LINE START POSITION 300, 700) |
| <ADDRESS> | ATTRIBUTE INFORMATION (GOTHIC STYLE, 10-POINT, BLOCK START POSITION 300, 900) |
| <NAME> | ATTRIBUTE INFORMATION (GOTHIC STYLE, 10-POINT, LINE START POSITION 300, 700) |
| VARIABLE DATA 1 | www.*.*.*/variable01.asp |
| TEMPLATE CONVERSION DATA 2 | (ACTUAL PRINT DATA) |
| <EXCHANGE RATE> | ATTRIBUTE INFORMATION (GOTHIC STYLE, 10-POINT, BLOCK START POSITION 200, 700) |
| <LONG-RANGE FORECAST> | ATTRIBUTE INFORMATION (GOTHIC STYLE, 10-POINT, BLOCK START POSITION 200, POSSIBLE) |
| <SHORT-RANGE FORECAST> | ATTRIBUTE INFORMATION (GOTHIC STYLE, 10-POINT, BLOCK START POSITION 200, POSSIBLE) |
| VARIABLE DATA 2 | www.*.*.*/variable02.asp |

| COMMAND | TEMPLATE RE-MAKING REQUEST |
|---|---|
| RECORD IDENTIFIER | 5 |

| COMMAND | PRINT COMPLETION |
|---|---|
| RECORD IDENTIFIER | 1, 5, 6 |

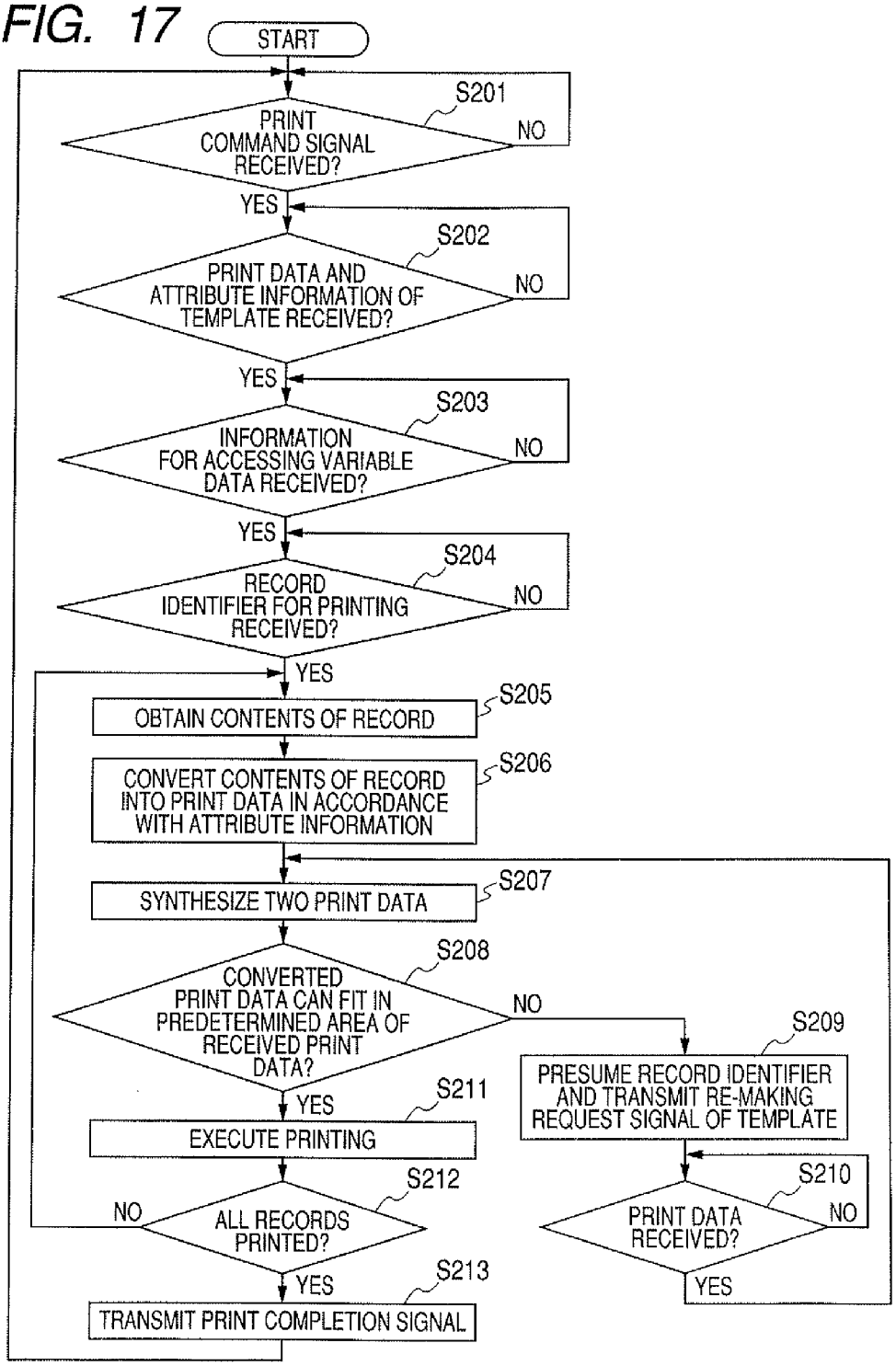

INFORMATION PROCESSING APPARATUS, PRINT CONTROL METHOD, AND COMPUTER PROGRAM

BACKGROUND OF THE INVENTION

1. Field of the Invention

The present invention relates to an information processing apparatus, a print control method, and a computer program and, more particularly, the invention is suitable when it is used to input electronic data which is different every original into a data area of electronic data which is common to a plurality of originals and to execute printing.

2. Description of the Related Art

Use of what is called a variable print system is increasing in recent years owing to development of an electrophotographic printing technique. According to the variable print system, for example, electronic data of a portion which is common to a plurality of originals (original documents) and electronic data of portions which differ in the respective originals are separately held and the electronic data of the portion common to the plurality of originals and the electronic data of the portions which differ in the respective originals are combined upon printing, thereby forming a print original.

By such a method, a plurality of originals in which most of contents of the respective originals are identical and only contents of the partial portions are different can be efficiently printed. Therefore, resources which are used in a printing process can be reduced.

For example, in the case where direct mail of a guidance for attendance at a lecture in a cram school having a plurality of branch classes is printed according to an inquiry from the customer, electronic data which is common to a plurality of cram schools is selected as electronic data of contents of a curriculum disclosed in the direct mail. On the other hand, electronic data of an address near an address of the customer among addresses of the branch classes is selected as electronic data of the open branch class. A technique in which the selected two electronic data are combined and a print original which has been optimized according to a request of the customer is formed and printed has been proposed (refer to Japanese Patent Application Laid-Open No. H11-254782).

In recent years, in the case of using the variable print system, there is often used such a form that the client who requests a print shop to print gives electronic data of a portion which is common to each original and a table of electronic data of portions which differ in the respective originals to the print shop and requests the print shop to print. In the following description, the electronic data of the portion which is common to each original is called a "template" as necessary, the electronic data of the portions which differ in the respective originals is called a "record" as necessary, and the table of the electronic data of the portions which differ in the respective originals is called a "variable data" as necessary.

The number of cases where the print shop receives a contract for work up to processes after the printing (hereinbelow, also referred to as post-printing processes) in order to provide further convenience to the client is increasing. As post-printing processes, for example, a booklet, an insertion into an envelope, a packing, a delivery, and the like can be mentioned. The client who requests the print shop to execute the work up to the post-printing processes designates time of completion of all of the post-printing processes and requests the print shop to print. Further, when the client requests the print shop to print, he designates the variable data. For example, there is a case where addresses of the customers of the client are designated as variable data. However, the client cannot presume the time when the customer's address is changed due to a house-moving of the customer or the like. For example, in Japanese Patent Application Laid-Open No. H11-254782 mentioned above, such a change in customer's address is not considered. Therefore, if the address recorded at the time of the print request differs from the address printed at the time of the print completion, there is a possibility that printed matter whose transmission has been requested by the client cannot reach the customer. There is also a case where data such as stock price, exchange, or the like which changes momentarily is designated as variable data. In the case where such data which changes momentarily is designated as variable data, it is desired that contents of each record of the variable data can be changed even after the printing was requested.

There is also a case where the post-printing processes differ depending on the contents of each record of the variable data. For example, if addresses of delivery destinations are included in the contents of the records, the post-printing process become a process for mounting delivery matter (printed matter) into a distribution route truck corresponding to each address. In such a case, departure time of the corresponding distribution route truck differs depending on the address shown in the record.

From the above description, time when the client decides the contents of each record ought to be different every record also in consideration of the processes after the printing. However, according to the related art, since nothing is considered about the post-printing processes of each record, all records are decided at the same time and the printing is requested and there is, consequently, such a problem that it is difficult to cope with the foregoing data change.

The invention is made in consideration of such problems and it is an object of the invention that when electronic data which differs in respective originals is input into electronic data which is common to a plurality of originals and printing is executed, print start time is decided on an original unit basis in consideration of post-processing time.

SUMMARY OF THE INVENTION

The inventors et al. of the present invention have vigorously examined in order to solve the above problems, so that they have found out the following embodiments of the invention. According to the invention, there is provided an information processing apparatus for transmitting a print command by using a template including a data area in which contents data is input and the contents data, comprising: an obtaining unit configured to obtain post-printing process information which is used to decide a start time of a post-printing process which is executed to printed matter based on the template to which the contents data has been input; a deriving unit configured to derive a time for starting printing by using the contents data and the template every record constructed by the contents data based on the post-printing process information obtained by the obtaining unit; and an instructing unit configured to instruct the printing using the contents data of the record to be printed for the time derived by the deriving unit and the template by using the time derived by the deriving unit.

Further features of the present invention will become apparent from the following description of exemplary embodiments with reference to the attached drawings.

BRIEF DESCRIPTION OF THE DRAWINGS

FIGS. 5A and 5B illustrate the embodiment of the invention and are diagrams illustrating a second example of the contents of the template.

FIG. 6 illustrates the embodiment of the invention and is a diagram illustrating a first example of contents of variable data.

FIG. 7 illustrates the embodiment of the invention and is a diagram illustrating a second example of the contents of the variable data.

FIG. 8 illustrates the embodiment of the invention and is a diagram illustrating an example of a state where "a Zip code, an address, and a name" in a record No. "2" have been inserted into the template.

FIG. 9 illustrates the embodiment of the invention and is a diagram illustrating an example of a state where "an exchange rate, a long-range forecast, and a short-range forecast" in the variable data have been inserted into the template.

FIG. 10 illustrates the embodiment of the invention and is a diagram illustrating an example of information (format of a print request) included in a print request signal.

FIG. 11 is comprised of FIGS. 11A and 11B illustrating the embodiment of the invention and FIG. 11A is a flowchart for describing an example of the operation in a PC in a POD system.

FIG. 11B illustrates the embodiment of the invention and is a flowchart sequel to FIG. 11A.

FIG. 12 illustrates the embodiment of the invention and is a diagram illustrating an example of contents of a Zip code—region conversion table.

FIG. 13 illustrates the embodiment of the invention and is a diagram illustrating an example of contents of a distribution route running information table.

FIG. 15 illustrates the embodiment of the invention and is a diagram illustrating an example of contents (format of data) of information which is transmitted from the POD system to a print system together with a print command signal.

FIGS. 16A and 16B illustrate the embodiment of the invention and are diagrams illustrating an example of contents (format of command) of a re-making request signal of the template and contents (format of command) of a print completion signal.

FIG. 17 illustrates the embodiment of the invention and is a flowchart for describing an example of the operation in a PC in the print system.

DESCRIPTION OF THE EMBODIMENTS

Subsequently, an embodiment of the invention will be described with reference to the drawings.

Figure 1:
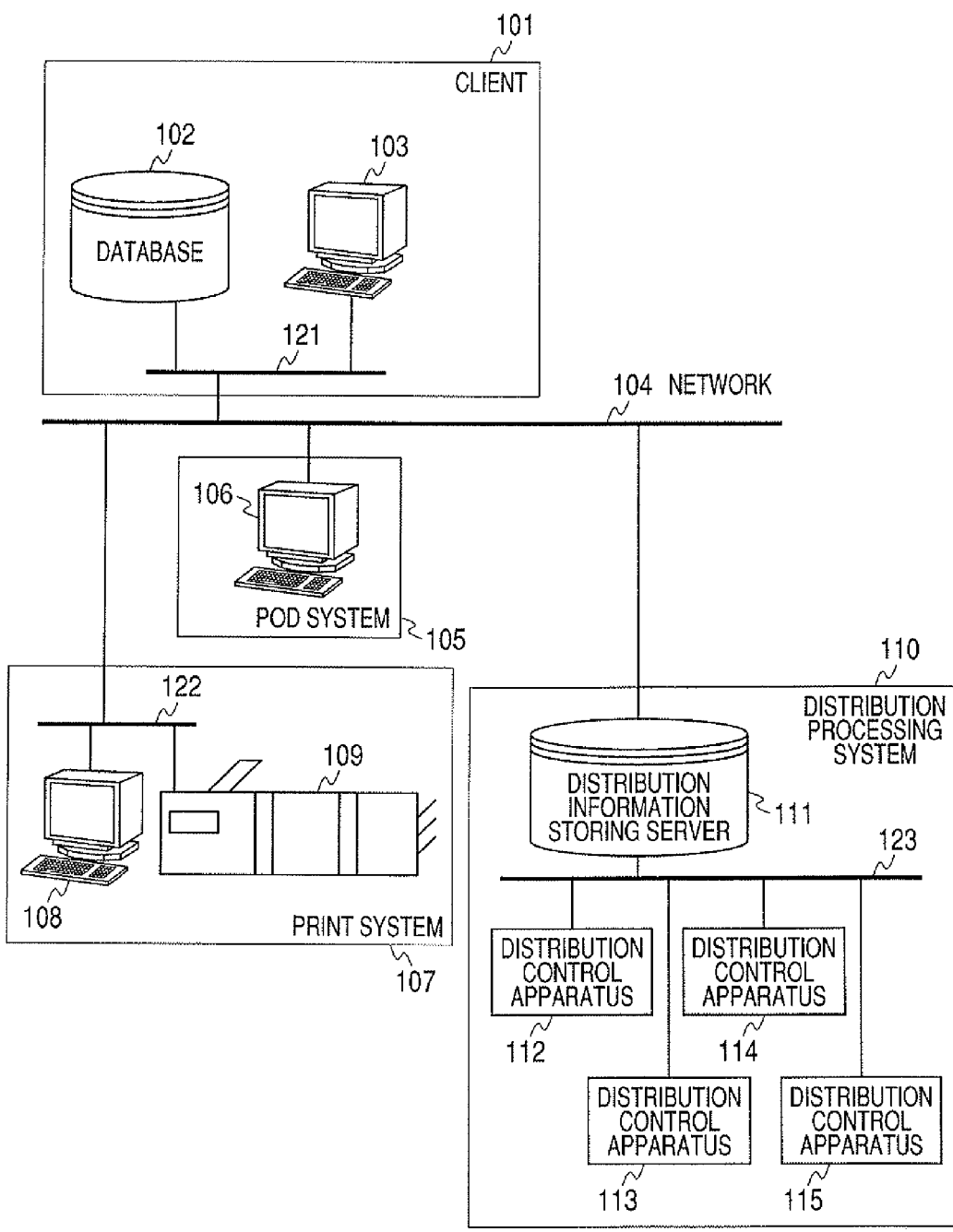
FIG. 1 illustrates an embodiment of the invention and is a diagram illustrating an example of a schematic construction of a POD print system.

FIG. 1 is a diagram illustrating an example of a schematic construction of a POD (Print On Demand) print system. In FIG. 1, a client 101 forms a template and variable data and requests printing. The client 101 has a database 102 and a PC (personal computer) 103. The database 102 stores the template and the variable data. The PC 103 as an example of client terminal apparatuses forms the template and the variable data and updates contents of the database 102. The PC 103 and the database 102 are mutually connected through a LAN 121.

A POD system 105 has a PC 106 for performing various kinds of adjustments and processes which are necessary for printing.

A print system 107 is provided to execute the printing and has a PC 108 and a printer 109. The PC 108 controls the printer 109 and modifies print data. The printer 109 executes the printing according to control of the PC 108. The PC 108 and the printer 109 are mutually connected through a LAN 122.

A distribution processing system 110 is constructed in such a manner that after the printing, printed matter is enclosed in a delivery unit such as a truck or the like and a delivery process is executed. The distribution processing system 110 has a distribution information storing server 111 and distribution control apparatuses 112 to 115. The case where the delivery unit is, for example, the truck will be described hereinbelow.

Information of the truck (for example, destination, departure time, arrival time) and the like have been stored in the distribution information storing server 111. Each of the distribution control apparatuses 112 to 115 has a PC for controlling the running of the truck per destination. The distribution information storing server 111 and the distribution control apparatuses 112 to 115 are mutually connected through a LAN 123.

The client 101, POD system 105, print system 107, and distribution processing system 110 are mutually connected through a network 104 such as Internet or the like.

The PC 103 in the client 101 can always update contents stored in the database 102. The POD system 105 (PC 106) and the print system 107 (PC 108) can refer to (obtain) the contents in the database 102 through the network 104.

Contents of the distribution information storing server 111 can be updated by the distribution control apparatuses 112 to 115. The POD system 105 can refer to (obtain) the contents in the distribution information storing server 111 through the network 104.

Figure 2:
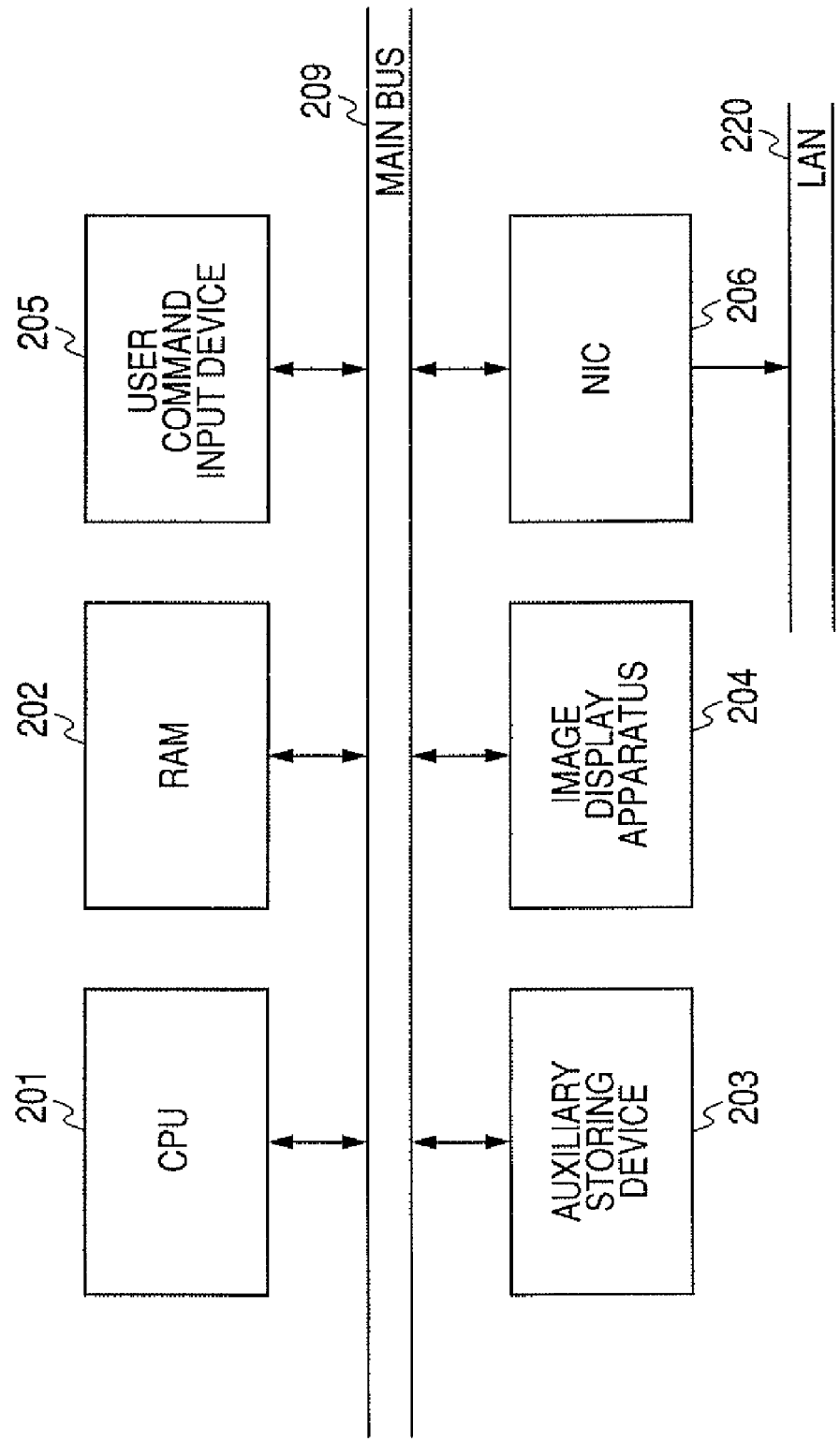
FIG. 2 illustrates the embodiment of the invention and is a diagram illustrating an example of a construction of PCs, a distribution information storing server, and distribution control apparatuses.

FIG. 2 is a diagram illustrating an example of a construction of the PCs 103, 106, and 108, the distribution information storing server 111, and the distribution control apparatuses 112 to 115.

In FIG. 2, in order to realize functions, which will be described in the embodiment, a CPU 201 executes programs stored in an auxiliary storing device 203 by using a RAM 202 and integratedly controls the whole apparatus. The RAM 202 is a storing medium for providing a work area of the CPU 201 and temporarily storing data.

The auxiliary storing device 203 stores a communicating program for realizing functions, which will be described in the embodiment, and stores the data. The auxiliary storing device 203 is realized by using, for example, at least any one of a hard disk, a flexible disk, a CD-ROM, an MO, and a DVD. An image display apparatus 204 is an apparatus for displaying an image for the purpose of, for example, notifying the user of the PC of a message, or the like. Specifically speaking, the image display apparatus 204 is, for example, a CRT display, a DSTN liquid display, or the like.

A user command input device 205 is a user interface which can be operated by the user. The user command input device 205 inputs a command designated by the user. The user command input device 205 is realized by using, for example, at least either a mouse or a keyboard. A network interface card (NIC) 206 is provided to bidirectionally transmit and receive data to/from another information apparatus through a LAN 220. A main bus 209 is provided to mutually connect the CPU 201, RAM 202, auxiliary storing device 203, image display apparatus 204, user command input device 205, and NIC 206.

The LAN 220 illustrated in FIG. 2 is the same as the LANs 121, 122, and 123 illustrated in FIG. 1. Although the case where the interface for transmitting and receiving the data to/from another information apparatus is the NIC 206 has been shown and described as an example in FIG. 2, a parallel interface, a serial interface, a USB, or the like may be used in place of the NIC 206.

Figure 3:
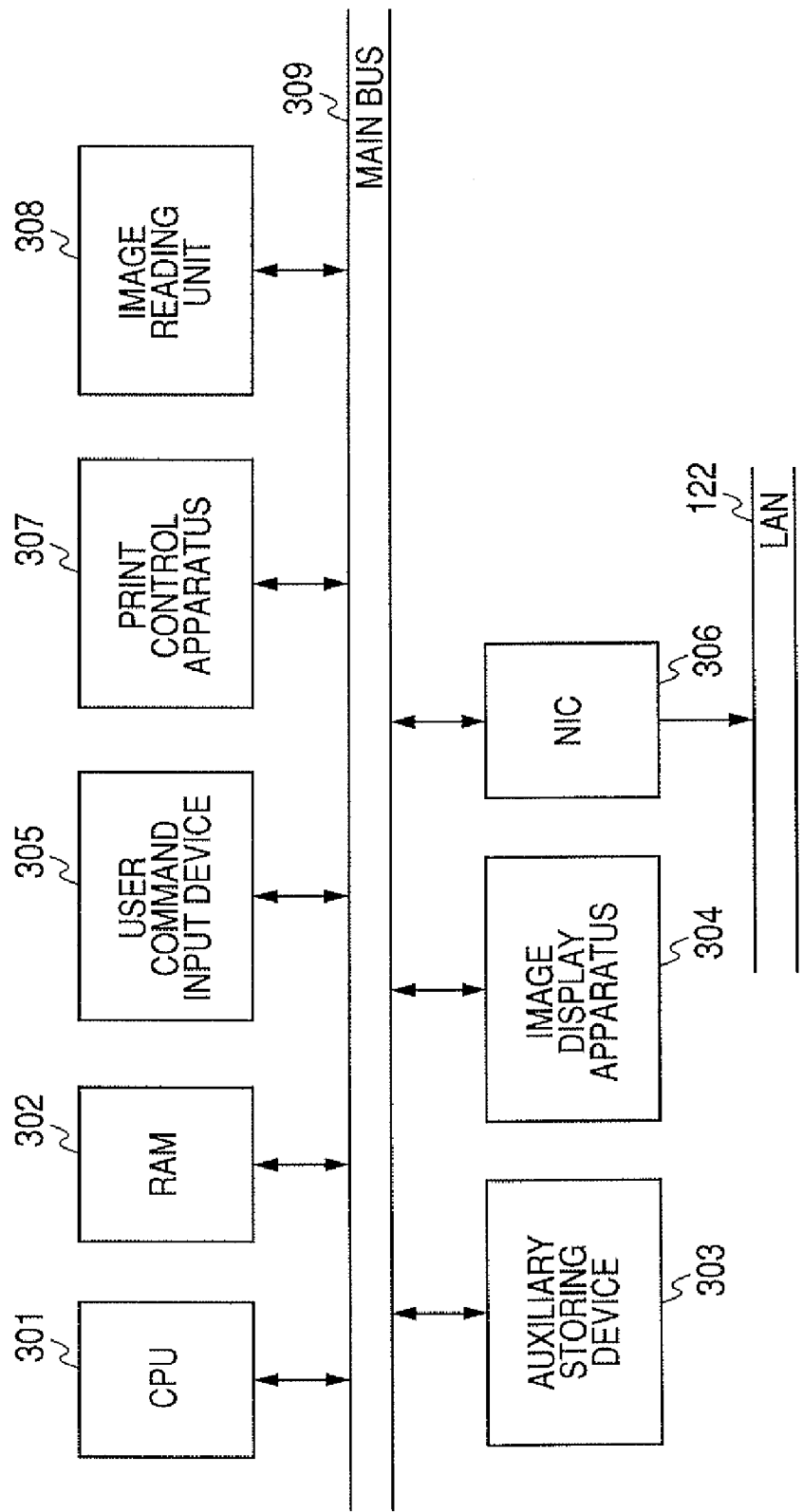
FIG. 3 illustrates the embodiment of the invention and is a diagram illustrating an example of a construction of a printer.

FIG. 3 is a diagram illustrating an example of a construction of the printer 109.

In FIG. 3, in order to realize functions, which will be described in the embodiment, a CPU 301 executes a program stored in an auxiliary storing device 303 by using a RAM 302 and integratedly controls the whole printer 109. For example, the CPU 301 makes print control and finishing control.

The RAM 302 is a storing medium for providing a work area of the CPU 301 and temporarily storing print data. The auxiliary storing device 303 temporarily stores the print data, is used as a storing medium in place of the RAM 302 based on a discrimination result of the CPU 301 or stores a program. The auxiliary storing device 303 is realized by using, for example, at least any one of a hard disk, a CD-ROM, an MO, and a DVD.

An image display apparatus 304 displays, for example, a state of the printer 109 or an image such as an error message or the like. A user command input device 305 is a user interface which is used for the user to operate. The user command input device 305 has various kinds of buttons, a ten-key, and a touch panel. A network interface card (NIC) 306 is provided to bidirectionally transmit and receive data to/from another information apparatus through the LAN 122. The image display apparatus 304 and the user command input device 305 can be also constructed as a single module by using a touch panel or the like.

A print control apparatus 307 is an apparatus for actually outputting the print data received from the PC or the like onto a sheet of paper. The print control apparatus 307 also controls a finisher. An image reading unit 308 reads an image on the original and inputs monochromatic binary (or color) image data. A main bus 309 is provided to mutually connect the CPU 301, RAM 302, auxiliary storing device 303, image display apparatus 304, user command input device 305, NIC 306, print control apparatus 307, and image reading unit 308.

An example of the operation of the client 101 will now be described.

The PC 103 of the client 101 receives an input of the user command input device 205 which is performed by the user and forms the template and the variable data. The PC 103 stores contents of the template and contents of the variable data into the database 102.

FIGS. 4A, 4B, 5A, and 5B are diagrams illustrating examples of the contents of templates 401 and 501.

Figure 4A:
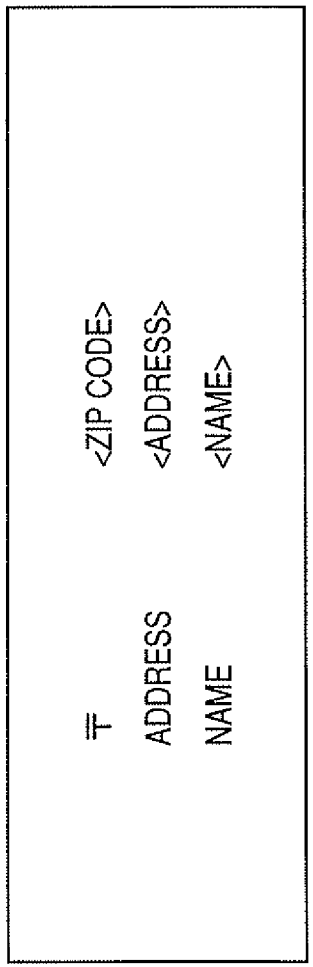
FIGS. 4A and 4B illustrate the embodiment of the invention and are diagrams illustrating a first example of contents of a template.
Figure 4B:
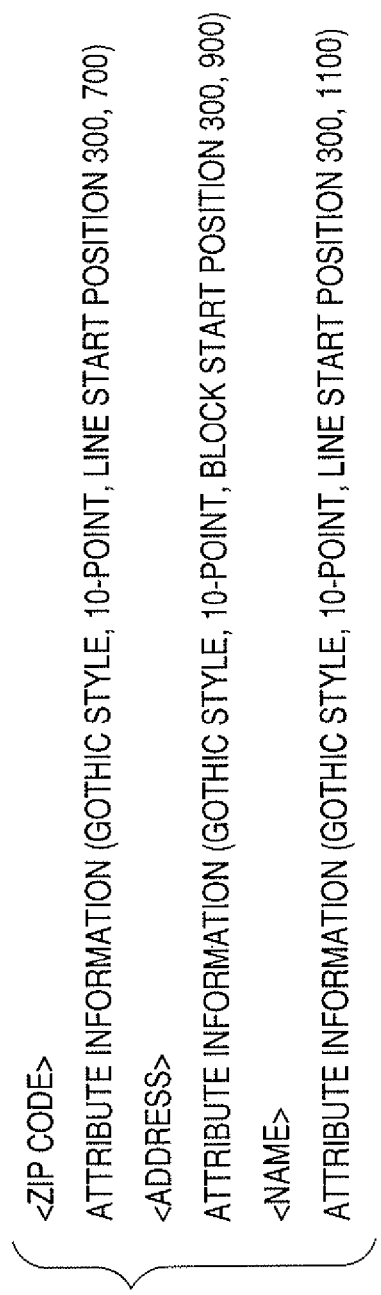

Information to form a print surface on which information of a delivery destination is written is illustrated in FIGS. 4A and 4B. Portions other than <Zip code>, <Address>, and <Name> illustrated in FIG. 4A indicate the information of the template (electronic data which is common to a plurality of originals).

In FIG. 4A, <Zip code> indicates contents data of a record which is inserted and a position where the contents data is input. Attribute information (Gothic style, 10-point, line, start position 300, 700) of characters of the contents data which is inserted into <Zip code> is illustrated in FIG. 4B. This attribute information shows that a character style is the Gothic style, a size of character is set to 10-point, an inserting form is set to one line (fixed), and a position of a head character is a position of coordinates (300, 700) (a position of an axis of abscissa is equal to 300, a position of an axis of ordinate is equal to 700). The record is, for example, a set of electronic data (contents data). Specifically speaking, a record "7" illustrated in FIG. 6 is a set of contents data of "Hachiro Yoshida", "140-0000", and " . . . , Shinagawa, Tokyo-to". Each contents data is arranged in < > in FIG. 4A.

In FIG. 4A, <Address> indicates the contents data of the variable data which is inserted and a position where the contents data is inserted. Attribute information (Gothic style, 10-point, block, start position 300, 900) of characters of the contents data which is inserted into <Address> is illustrated in FIG. 4B. This attribute information shows that a character style is the Gothic style, a size of character is set to 10-point, an inserting form is set to a block, and a position of a head character is a position of coordinates (300, 900).

In FIG. 4A, this is true of <Name>. Attribute information (Gothic style, 10-point, line, start position 300, 1100) of characters of a record which is inserted into <Name> is illustrated in FIG. 4B. This attribute information shows that a character style is the Gothic style, a size of character is set to 10-point, an inserting form is set to a line, and a position of a head character is a position of coordinates (300, 1100).

Information to form actual contents is illustrated in FIGS. 5A and 5B. As illustrated in FIG. 5A, portions other than <Exchange rate>, <Long-range forecast>, and <Short-range forecast> indicate the information of the template (electronic data which is common to a plurality of originals). In FIG. 5A, <Exchange rate>, <Long-range forecast>, and <Short-range forecast> indicate the contents data which is inserted and the position where the contents data is inserted.

Attribute information (Gothic style, 10-point, block, start position 200, 700) of characters of the contents data which is inserted into <Exchange rate> is illustrated in FIG. 5B. This attribute information shows that a character style is the Gothic style, a size of character is set to 10-point, an inserting form is set to a block, and a position of a head character is a position of coordinates (200, 700).

Attribute information (Gothic style, 10-point, block, start position 200, possible) of characters of the contents data which is inserted into <Long-range forecast> and <Short-range forecast> is also illustrated in FIG. 5B. This attribute information shows that a character style is the Gothic style, a size of character is set to 10-point, an inserting form is set to a block, and a position of a head character is a position of coordinates (200, possible). "possible" denotes that the characters do not overlap with other characters but can be located to an upper portion as high as possible.

FIGS. 6 and 7 are diagrams illustrating examples of contents of variable data 601 and 701.

The contents of the variable data 601 illustrated in FIG. 6 differ every record. "Zip code, address, and name" in each record is the contents data which is inserted (input) into the template 401 illustrated in FIGS. 4A and 45 according to each of the attribute information. FIG. 8 is a diagram illustrating an example of a state where "Zip code, address, and name" in a record No. "2" in FIG. 6 have been inserted into the template 401.

The contents of the variable data 701 illustrated in FIG. 7 are always updated by the PC 103 in the client 101. The updated contents "exchange rate, long-range forecast, and short-range forecast" are inserted into the template 501 illustrated in FIGS. 5A and 5B according to the respective attribute information. FIG. 9 is a diagram illustrating an example of a state where "exchange rate, long-range forecast, and short-range forecast" in the variable data 701 have been inserted into the template 501.

As mentioned above, in the embodiment, for example, the records in the variable data 601 and 701 are set as electronic data which differs every original.

The client 101 (PC 103) transmits a print request signal to the PC 106 in the POD system 105 through the network 104 according to operation of the user command input device 205 which is executed by the user. A URL for allowing the PC 106 to access the variable data 601 and 701 and a URL for allowing the PC 106 to access the templates 401 and 501 are included in the print request signal. A delivery completion time (time/date) instructed by the user of the PC 103 is also included in the print request signal. Further, there is a case where a request identifier is included in the print request signal. The request identifier is an identifier for requesting so that the contents of the latest variable data are reflected to the printed matter as much as possible. If the request identifier is included in the print request signal, the PC 106 executes a process for reflecting the contents of the latest variable data to the printed matter as much as possible. If the request identifier is not included in the print request signal, the PC 106 executes an ordinary process using the variable data. The request identifier is set by a method whereby the user operates the user command input device 205 of the PC 103. FIG. 10 is a diagram illustrating an example of information (format of the print request) included in a print request signal 1001. In the example illustrated in FIG. 10, by setting a variable data decision delay request into "ON", the request identifier is included in the print request signal 1001.

Figure 18:
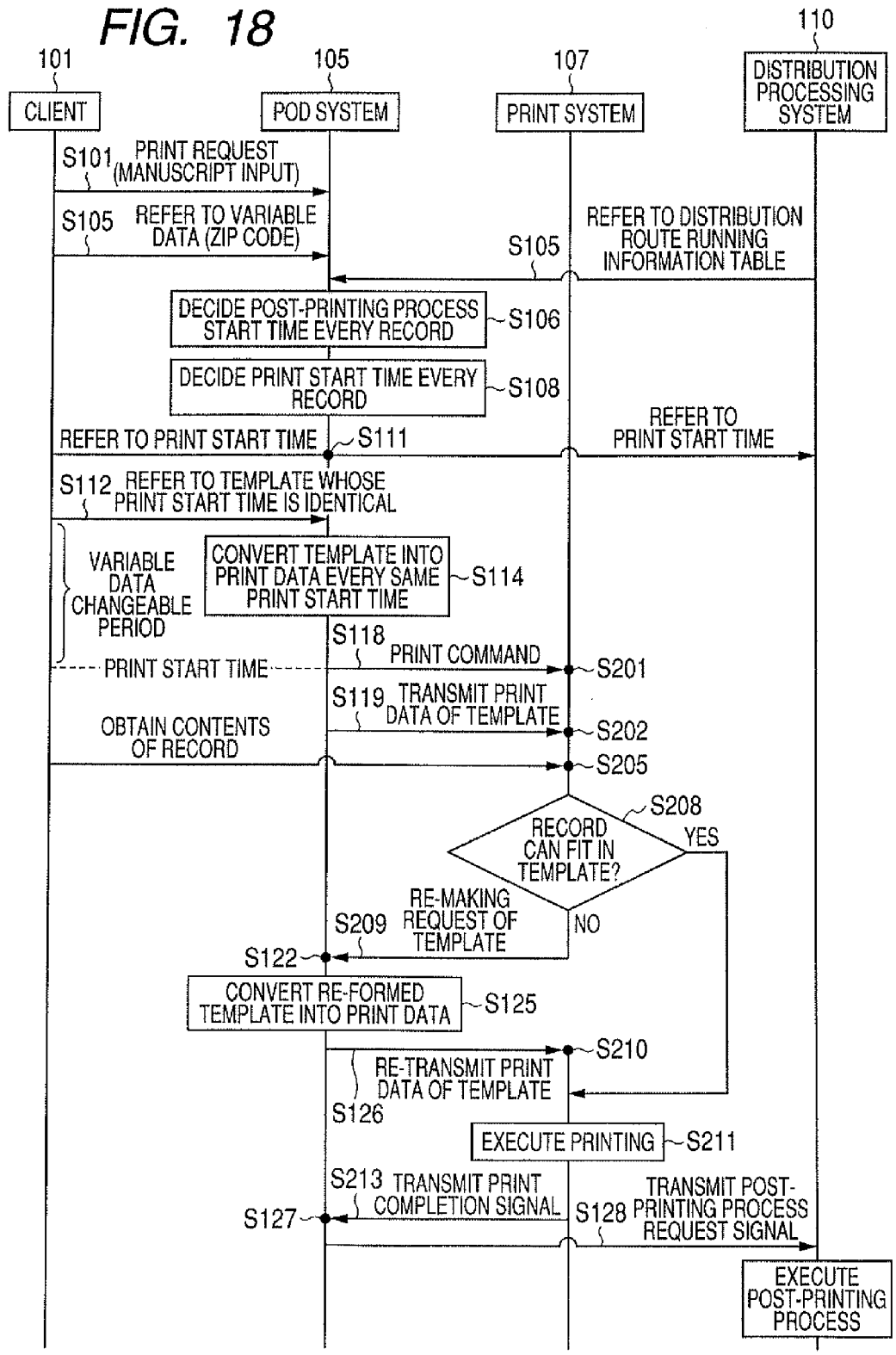
FIG. 18 illustrates the embodiment of the invention and is a diagram illustrating an example of an outline of processes in the POD print system.

Subsequently, an example of the operation of the PC 106 in the POD system 105 will be described in detail with reference to flowcharts of FIGS. 18, 11A, and 11B. The flowcharts illustrated in FIGS. 11A and 11B are realized by, for example, a method whereby the CPU 201 in the PC 106 executes programs stored in the auxiliary storing device 203. FIG. 18 is a diagram illustrating an example of an outline of processes in the POD print system illustrated in FIG. 1. In FIG. 18, it is assumed that the time elapses in order from the top toward the bottom.

First, in FIG. 11A, the CPU 201 waits until the print request signal transmitted from the client 101 (PC 103) is received through the network 104 (step S101). As mentioned above, in the embodiment, for example, a receiving unit for receiving the print request is realized by executing the process of step S101. As mentioned above, the URL for allowing the PC 106 to access the variable data 601 and 701 and the URL for allowing the PC 106 to access the templates 401 and 501 are included in the print request signal.

When the print request signal is received, the CPU 201 discriminates whether or not the request identifier is included in the print request signal (step S102). Specifically speaking, if the variable data decision delay request in FIG. 10 is "ON", the CPU 201 determines that the request identifier is included in the print request signal. As mentioned above, in the embodiment, a discriminating unit is realized by executing the process of step S102.

As a result of the above discrimination, if the request identifier is not included in the print request signal, the CPU 201 executes an ordinary variable printing process which does not consider the post-printing processes (step S103).

If the request identifier is included in the print request signal, the CPU 201 sets a count value of a record number counter n into an initial value (=1) (step S104). Subsequently, the CPU 201 obtains the Zip code of the variable data 601 whose record number is equal to "n" from the database 102 through the network 104. By using a Zip code—region conversion table 1201 (refer to FIG. 12) which has previously been stored in the auxiliary storing device 203 in the PC 106, the CPU 201 decides a region where printed matter of the nth record should be delivered. The CPU 201 decides the destination of the printed matter from the decided region (step S105). In the embodiment, since the case where the delivery of the printed matter by the truck is the post-printing process is shown as an example, the contents of the post-printing process is determined by deciding the destination of the printed matter. Although the delivery destination is determined by using the Zip code in the embodiment, for example, it may be decided by the address. Further, through the network 104, the CPU 201 obtains information (refer to FIG. 13) of a distribution route running information table 1301 stored in the distribution information storing server 111. The table 1301 shows departure time (time/day) and scheduled arrival time (time/day) of the truck of every region (destination).

Subsequently, based on the destination of the printed matter of the nth record, the delivery completion time included in the print request signal, and the distribution route running information table 1301, the CPU 201 decides the truck (distribution route) in which the printed matter of the nth record is mounted. The CPU 201 obtains the departure time of the truck (distribution route) from the distribution route running information table 1301. The obtained information is post-printing process information and the start time (time/day or time) of the post-printing processes is decided by using the post-printing process information (step S106) In this manner, the post-printing process information in the embodiment is the information which is used to decide the start time of the post-printing processes. That is, by executing the process of step S106, an obtaining unit for obtaining the post-printing process information is realized. It is not always necessary to limit the post-printing process to the conveyance of the printed matter but, for example, a booklet process and a cutting process can be also set into the post-printing processes. In such a case, for example, when using a book binder or a cutting machine which differs every address, the time when each book binder or cutting machine can be used becomes the start time of the post-printing processes.

Figure 14:
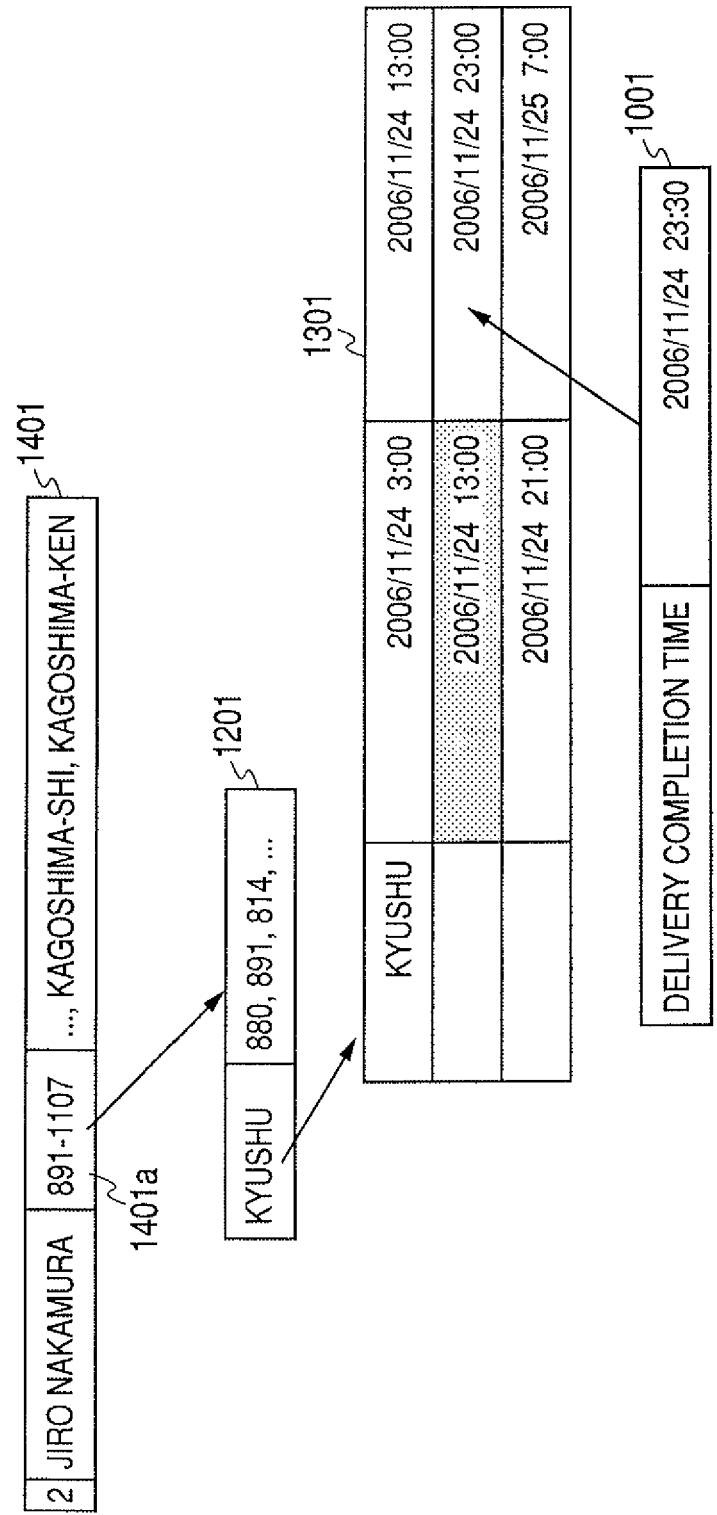
FIG. 14 illustrates the embodiment of the invention and is a diagram conceptually illustrating an example of a method of deciding a departure time of a truck (distribution route).

FIG. 14 is a diagram conceptually illustrating an example of a method of deciding the departure time of the truck (distribution route). In the example illustrated in FIG. 14, the CPU 201 collates a Zip code 1401a of a record 1401 in which the record number of the variable data 601 illustrated in FIG. 6 is equal to "2" with the Zip code—region conversion table 1201 illustrated in FIG. 12. Thus, the CPU 201 decides the region where the printed matter of the nth record number should be delivered is "Kyushu". The CPU 201 selects an optimum one of the trucks whose destinations are set to "Kyushu" with reference to the distribution route running information table 1301 illustrated in FIG. 13. That is, since the delivery completion time (time/day) included in the print request signal 1001 is "23:30, Nov. 24, 2006", the CPU 201 selects the truck which will reach "Kyushu" at "23:00, Nov. 24, 2006" as an optimum truck. The CPU 201 decides "13:00, Nov. 24, 2006" as start time of the post-printing processes (timing to start the post-printing processes).

Returning to the description of FIGS. 11A and 11B, the CPU 201 calculates a time (print time) necessary for actually printing the nth record based on a print speed of the printer 109 and the number of print sheets of the record of the nth record number (step S107).

The CPU 201 examines a time for which resources necessary for other printing can be assured or the like. Specifically speaking, as a time which is examined by the CPU 201, for example, "a time for which a preparation of paper and ink is completed", "a time which is required until resources of the printer 109 are assured", "a merge time including a time which is required for re-printing or the like in the case where the printing fails", or the like can be mentioned.

The CPU 201 decides time (time/date or time) for starting the printing of the nth record based on the start time of the post-printing processes obtained in step S106, the print time calculated in step S107, the time for which the resources necessary for other printing can be assured, and the like. The CPU 201 holds the decided time for starting the printing as a print start time (timing to start the printing) of the nth record into the auxiliary storing device 203 (step S108). As mentioned above, in the embodiment, for example, by executing the process of step S108, a deriving unit for deriving the print start timing every record is realized.

By using a scheduled print table in which the print start time decided in step S108 and the record number are stored in correspondence to each other, the CPU 201 can hold the print start time of the nth record into the auxiliary storing device 203.

Subsequently, the CPU 201 increases the count value of the record number counter "n" by "1" (step S109). The CPU 201 discriminates whether or not the count value of the record number counter "n" is larger than the number (N) of records of the variable data 601 (refer to FIG. 6) (step S110). As a result of the discrimination, if the count value of the record number counter "n" is equal to or less than the number (N) of records of the variable data 601, it is determined that the records whose print start time should be decided still remain in the variable data 601, and the processing routine is returned to step S105. Until the print start time of all records in the variable data 601 is decided, the processes of steps S105 to S110 are repetitively executed. In step S110, if it is determined that the count value of the record number counter "n" is larger than the number (N) of records of the variable data 601 and the print start time of all records in the variable data 601 is decided, the processing routine advances to step S111.

Based on an instruction from the CPU 201, the NIC 206 transmits "the print start time of each record" decided in step S110 to the client 101 (PC 103). Thus, the user of the client 101 can grasp until when the variable data 601 and 701 can be changed. Based on an instruction from the CPU 201, the NIC 206 also transmits "the print start time of each record" decided in step S110 to the distribution processing system 110 (distribution control apparatuses 112 to 115).

It is assumed here that the POD system 105 spontaneously transmits "the print start time of each record" to the client 101 and the distribution processing system 110. However, the POD system 105 may transmit "the print start time of each record" to the client 101 and the distribution processing system 110 in response to requests from the client 101 and the distribution processing system 110.

Subsequently, the CPU 201 arranges the decided print start times of all of the records in order of the time and collects the records of the same print start time. Such a process corresponds to the process for deciding the records whose printing is started at the same time by using the print start time derived every record. The CPU 201 selects the record in which a print area of data whose print area can be varied (for example, <Address>) is maximum (step S112). The CPU 201 obtains the templates 401 and 501 which are used for printing from the database 102. The CPU 201 determines a layout of the obtained templates 401 and 501 (step S112) so that the contents of the record selected in step S112 can be combined (step S113). That is, if a plurality of records whose printing is started at the same time are specified, the CPU 201 decides a data area size of the templates obtained so that each of the contents data constructing such a plurality of records can be enclosed. For example, in the database in FIG. 6, if the records 3 and 7 are decided as records which are delivered to a Kanto district at the same time, the number of characters of the contents data of the address of the record 3 and that of the record 7 are different. Now, assuming that the number of characters in the case of the record 3 is larger than that in the case of the record 7, the CPU 201 changes the data area size of the templates obtained so that the contents data of the address of the record 3 can be enclosed. Therefore, it is unnecessary to transmit a plurality of templates in order to cope with a plurality of records to be delivered at the same time and it is possible to cope with them by one template. Consequently, a transmitting efficiency is improved.

Subsequently, in a state where the variable data 601 and 701 are not assembled, the CPU 201 converts the templates 401 and 501 of the layout decided in step S113 into print data (RIP data) which can be printed by the printer 109. The CPU 201 stores the converted print data into the auxiliary storing device 203 (step S114). As mentioned above, in the embodiment, by executing the process of step S114, a storing unit is realized.

Subsequently, the CPU 201 discriminates whether or not the processes of steps S112 to S114 have been executed with respect to all print start times (all records) (step S115). As a result of the discrimination, if the processes are not executed, the processes of steps S112 to S114 are executed to the records each having the print start time in which the processes are not executed.

When the processes of steps S112 to S114 have been executed with respect to all of the print start times, the processing routine advances to step S116 in FIG. 11B. The CPU 201 compares the present time (time/date or time) with the print start times of all of the records and discriminates the presence or absence of the records whose printing should be started (the records which have reached the print start time) (step S116).

As a result of the discrimination, if the records whose printing should be started (the records which have reached the print start time) do not exist, the CPU 201 discriminates whether or not the variable data 601 and 701 in the database 102 have been changed (step S117). As a result of the discrimination, if the variable data 601 and 701 are not changed, the processing routine is returned to step S116.

If the variable data 601 and 701 have been changed, the processing routine is returned to step S104 and the print start time of each record is obtained again. Although the print start time of each record is obtained again here, if the PC 106 has already grasped which record of the variable data 601 and 701 has been changed, the print start time can be also obtained again only with respect to such a record. In such a case, it is sufficient that the processing routine advances to step S111 after the processes of steps S105 to S108 were executed with respect to the changed record.

If the records whose printing should be started (the records which have reached the print start time) exist in step S116, the NIC 206 transmits a print command signal to the print system 107 (PC 108) based on an instruction from the CPU 201 (step S118). As mentioned above, in the embodiment, for example, by executing the process of step S118, an instructing unit is realized.

Subsequently, the CPU 201 reads out the print data which is used for printing among the print data converted from the templates 401 and 501 in step S113 from the auxiliary storing device 203. The NIC 206 transmits the read-out print data and attribute information of the templates 401 and 501 corresponding to the print data to the print system 107 based on an instruction from the CPU 201 (step S119) As mentioned above, in the embodiment, for example, by executing the process of step S119, a first output unit is realized.

Subsequently, the NIC 206 transmits information (for example, URL) for accessing the variable data 601 and 701 to the print system 107 (PC 108) based on an instruction from the CPU 201 (step S120). As mentioned above, in the embodiment, for example, by executing the process of step S120, a second output unit is realized.

Subsequently, the NIC 206 transmits an identifier of the record which has been determined in step S116 and whose printing should be started to the print system 107 (PC 108) based on an instruction from the CPU 201 (step S121). An example of contents of the information (data format) which is transmitted from the POD system 105 to the print system 107 (PC 108) together with the print command signal is illustrated in FIG. 15.

Subsequently, the CPU 201 discriminates whether or not the re-making request signal of the template has been received from the print system 107 (PC 108) (step S122). FIG. 16A illustrates an example of contents (format of command) of a re-making request signal 1601 of the template. As mentioned above, in the embodiment, for example, by executing the process of step S122, a change request receiving unit for receiving a change request is realized.

As a result of the discrimination, if the re-making request signal of the template has been received from the print system 107 (PC 108), step S123 follows. The CPU 201 obtains contents of the record identified by a record identifier included in the re-making request signal 1601 of the template from the database 102 through the network 104 (step S123). The CPU 201 forms the template 401 again so that the contents of the record obtained in step S123 can be assembled into the templates 401 and 501 of the record identified by the record identifier (step S124). For example, the CPU 201 forms again the template 401 in which an assembling position of <Address> has been expanded in the direction of an axis of ordinate.

Subsequently, the CPU 201 converts the re-formed template 401 into the print data which can be printed by the printer 109 (step S125). As mentioned above, in the embodiment, for example, by executing the processes of steps S124 and S125, a changing unit is realized.

Subsequently, the NIC 206 transmits the converted print data to the printer 109 based on an instruction from the CPU 201 (step S126). As mentioned above, in the embodiment, for example, by executing the process of step S126, a third output unit is realized.

Subsequently, the CPU 201 discriminates whether or not a print completion signal showing that the printing was completed has been received from the print system 107 (PC 108) (step S127). An example of contents (format of command) of a print completion signal 1602 is illustrated in FIG. 16B. As a result of the discrimination, if the print completion signal is not received, the processing routine is returned to step S122. If the print completion signal has been received, it is determined that all of the records which had been decided so that they reached the print start time in step S116 have been printed, then the processing routine advances to step S128. The NIC 206 transmits a post-printing process request signal to the distribution processing system 110 (distribution control apparatuses 112 to 115) based on an instruction from the CPU 201 (step S128).

Subsequently, the CPU 201 discriminates whether or not all of the records in the variable data 601 have been printed (step S129). As a result of the discrimination, if all of the records are not printed yet, the processing routine is returned to step S116. If all of the records have been printed, the processing routine is finished.

As mentioned above, in the embodiment, an information processing apparatus is realized by using the PC 106 in the POD system 105 and a print control apparatus is realized by using the PC 108 and printer 109 in the print system 107.

By deciding the print start time every record as mentioned above, an opportunity of changing the contents of the contents data can be given to the client. In the case of starting the printing of all of the records in a lump as disclosed in the related art, although the location for assuring the printed matter of all of the records is necessary, by using the invention, it is possible to cope with such a case by a location smaller than the location for assuring the printed matter of all of the records.

Subsequently, an example of the operation of the PC 108 in the print system 107 will be described in detail with reference to a flowchart of FIG. 17. The flowchart illustrated in FIG. 17 is realized by, for example, a method whereby the CPU 201 in the PC 108 executes the programs stored in the auxiliary storing device 203.

First, in FIG. 17, the CPU 201 waits until the print command signal is received from the PC 106 in the POD system 105 through the network 104 (step S201). As mentioned above, in the embodiment, for example, by executing the process of step S201, a receiving unit is realized.

When the print command signal is received, the CPU 201 waits until the print data of the templates 401 and 501 to be printed and the attribute information in the templates 401 and 501 are received (step S202). As mentioned above, in the embodiment, for example, by executing the process of step S202, a second obtaining unit is realized.

When those information is received, the CPU 201 waits until the information (for example, URL) for accessing the variable data 601 and 701 to be printed is received (step S203). As mentioned above, in the embodiment, for example, by executing the process of step S203, a third obtaining unit is realized.

When the information for accessing the variable data 601 and 701 is received, the CPU 201 waits until the record identifiers for identifying all of the records to be printed are received (step S204). If the record identifiers are received, the CPU 201 obtains the contents of the records which are identified by the received "record identifiers" according to the received "information for accessing the variable data 601" (step S205).

As mentioned above, in the embodiment, in response to the reception of the print command signal, the print data of the templates to be printed, the attribute information in the templates, the information for accessing the variable data to be printed, the record identifiers of the records to be printed, and the like are obtained.

Subsequently, the CPU 201 converts the obtained "contents of the records" into the print data according to the "attribute information in the templates 401 and 501" obtained (step S206). As mentioned above, in the embodiment, for example, by executing the processes of steps S205 and S106, a fourth obtaining unit is realized.

Subsequently, the CPU 201 synthesizes the print data received in step S202 and the print data converted in step S206 (step S207). The CPU 201 discriminates whether or not the converted print data can be enclosed in a predetermined position (in an area) of the received print data (step S208). As mentioned above, in the embodiment, for example, by executing the process of step S208, a discriminating unit is realized.

As a result of the above discrimination, if the converted print data cannot be enclosed in the predetermined area of the received print data, step S209 follows. The NIC 206 transmits the re-making request signal of the template to the POD system 105 (PC 106) based on an instruction from the CPU 201 (step S209). The record identifiers are included in the re-making request signal of the template. As mentioned above, in the embodiment, for example, by executing the process of step S209, a change request unit for requesting the change in layout of the templates 401 and 501 is realized as an example of a request for changing the data area of the template.

The CPU 201 waits until the print data of the templates which were formed again based on the re-making request signal of the template is received from the POD system 105 (PC 106) (step S210). When the print data is received, the processing routine is returned to step S207. As mentioned above, in the embodiment, for example, by executing the process of step S210, an obtaining unit is realized. By returning from step S210 to step S207 and executing the process of step S207, a synthesizing unit is realized.

If it is determined in step S208 that the print data converted in step S206 can be enclosed in the predetermined position (in the area) of the print data received in step S202, it is decided that the printing can be normally performed, so that the processing routine advances to step S211. The CPU 201 instructs the printer 109 to print the print data synthesized in step S207 (step S211), so that the printing is executed. As mentioned above, in the embodiment, for example, by executing the process of step S211, a print executing unit is realized.

The CPU 201 discriminates whether or not the printing of all of the records identified by the record identifiers received in step S204 has been completed (step S212). As a result of the above discrimination, if the printing of all of the records is not completed yet, in order to execute the printing of the record which is identified by the next record identifier, the processing routine is returned to step S205. The processes of steps S205 to S212 are repetitively executed until the printing of all of the records is completed. When the printing of all of the records has been completed, the NIC 206 transmits the print completion signal to the POD system 105 (PC 106) based on an instruction from the CPU 201 (step S213). The processing routine is returned to step S201 and the CPU 201 waits until the print request signal is received again.

As mentioned above, in the embodiment, the processes after the printing to the record are predetermined based on the contents of each record of the variable data 601. The time for starting the post-printing process is read out of the distribution route running information table 1301 and the start time of the post-printing processes (departure time of the truck) is determined every record based on the print start time. The print start time of each record is determined every record in consideration of the decided start time of the post-printing processes (departure time of the truck) and the printing of the record is started at such a time. Therefore, the print start time of each record can be set to a time which is as late as possible according to the post-printing processes (according to the time when the truck departs). Thus, the time (period) when the client 101 can change the contents of the record can be determined (optimized) every record. In other words, the client 101 can change or modify the contents of the record until the print start time decided for each record by the POD system 105.

In the embodiment, the templates 401 and 501 of the layout in which the print areas have been matched with the maximum record among the records of the same print start time are previously converted into the print data which can be printed by the printer 109. Therefore, the print time can be shortened. Consequently, the print start time of each record can be set to a later time.

In the embodiment, if the contents of the records cannot be enclosed in the areas set into the templates 401 and 501, the layout of the templates 401 and 501 is changed so that the contents of the records can be enclosed. Therefore, the records of the variable data 601 and 701 can be certainly inserted into the templates 401 and 501 and the printing can be executed.

Although the embodiment has been described as an example with respect to the case where the post-printing processes are assumed to be the distribution route process, the post-printing processes are not limited to such a process. For example, the post-printing processes may be a process for a mail service. In the case where the process for the mail service is executed as post-printing processes as mentioned above, there is a case where the post-printing processes are separated, for example, as follows according to the record contents. That is, there is a case where the post-printing processes are separated into: "the printed matter is inserted into an envelope for Airmail and the envelope is sent by mail"; "the printed matter is inserted into an ordinary envelope and the envelope is delivered by mail"; "the printed matter is inserted into a registered envelope and the envelope is delivered by mail"; and "the printed matter is delivered (distributed) as it is by mail". If the time for which each processor for executing such processes can be used or the processing time differs, the time when the post-printing processes of each record can be started or the print start time differs. Therefore, even if the post-printing processes are the processes for the mail service, the printing can be executed in consideration of the post-printing processes by using substantially the same method as the method described in the embodiment.

The printer 109 can be allowed to have the functions which the PC 108 has.

The case where the synthesization of the print data showing the contents of the records of the variable data 601 and 701 and the print data of the templates 401 and 501 is executed by the print system 107 side has been illustrated and described as an example in the embodiment. However, the synthesization of those print data may be performed on the POD system 105 side.

In such a case, for example, the processes of steps S205 to S207 in FIG. 17 are executed in place of steps S118 to S121 in FIG. 11B and the process of step S208 is executed in place of step S122. If the print data based on the contents of the records cannot be enclosed in the predetermined position (in the area) of the print data based on the templates, processes of steps S123 to S125 in FIG. 11B are executed. In place of steps S126 and S127, a process for transmitting the print data obtained by synthesizing the records and the templates to the print system 107 (PC 108) is executed.

If the print data based on the contents of the records can be enclosed in the predetermined position (in the area) of the print data based on the templates, the print data obtained by synthesizing the records and the templates is transmitted to the PC 108 without executing the processes of steps S123 to S125. In such a case, a process for waiting until the print data obtained by synthesizing the records and the templates is received is executed in place of step S201 in FIG. 17. Steps S202 to S210 are omitted and the printing based on the received print data is executed in step S211. According to the invention, an opportunity of changing the record contents can be given to the user in order to decide the print start time every record.

Other Embodiments of the Invention

Each unit constructing the information processing apparatus, print control apparatus, and print control system and each step of the print control method in the embodiment of the invention mentioned above can be realized by a method whereby the programs stored in a RAM, a ROM, or the like of a computer operate. The programs and a computer-readable recording medium in which the programs have been recorded are incorporated in the invention.

The invention can be also embodied as a form of, for example, a system, an apparatus, a method, a program, a storing medium, or the like. Specifically speaking, the invention can be also applied to a system constructed by a plurality of apparatuses or to an apparatus constructed by one equipment.

The invention also incorporates a case where a program of software for realizing the functions of the embodiment mentioned above (in the embodiment, the program corresponding to the flowcharts illustrated in FIGS. 11A, 11B, and 17) is supplied to a system or an apparatus directly or from a remote place and a computer of the system or apparatus reads out program codes of the supplied program and executes them.

Therefore, the program codes themselves which are installed to the computer in order to realize the functions and processes of the invention by the computer also realize the invention. That is, the invention also incorporates the computer program itself for realizing the functions and processes of the invention.

In such a case, the computer program may have any form such as object codes, program which is executed by an interpreter, script data which is supplied to the OS, or the like so long as it has the functions of the program.

As a recording medium for supplying the program, for example, the following medium can be mentioned: a floppy (registered trademark) disk; a hard disk; an optical disk; a magnetooptic disk; an MO; a CD-ROM; a CD-R; a CD-RW; a magnetic tape; a non-volatile memory card; a ROM; a DVD (DVD-ROM, DVD-R); or the like.

As another supplying method of the program, the program can be also supplied by a method whereby a client computer is connected to Homepage of the Internet by using a browser of the client computer, the computer program itself of the invention is downloaded from Homepage to the recording medium such as a hard disk or the like or a file in which the computer program has been compressed and which includes an automatic installing function is downloaded from Homepage to such a recording medium, thereby supplying the program.

The program supplying method can be also realized by a method whereby the program codes constructing the program of the invention are divided into a plurality of files and each file is downloaded from different Homepage. That is, a WWW server for allowing a plurality of users to download a program file for realizing the functions and processes of the invention by the computer is also incorporated in the invention.

The program supplying method can be also realized by a method whereby the program of the invention is encrypted, stored into a storing medium such as a CD-ROM or the like, and distributed to the users, the users who can satisfy predetermined conditions are allowed to download key information configured to decrypt the encryption from Homepage through the Internet, and the encrypted program is executed by using the downloaded key information and installed into the computer.

The computer executes the read-out program, so that the functions of the embodiment mentioned above are realized. As another method, an OS or the like which is operating on the computer executes a part or all of the actual processes based on instructions of the program and the functions of the embodiment mentioned above are also realized by those processes.

Further, the program read out of the recording medium is written into a memory provided for a function expanding board inserted into the computer or a function expanding unit connected to the computer, after that, a CPU or the like provided for the function expanding board or the function expanding unit executes a part or all of the actual processes based on instructions of the program, and the functions of the embodiment mentioned above are also realized by those processes.

Each of the foregoing embodiments has merely been shown as a specific example for embodying the invention and the technical scope of the invention must not be limitatively interpreted by them. That is, the invention can be also embodied by various forms without departing from its technical idea or its principal feature.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-160495, filed Jun. 18, 2007, which is hereby incorporated by reference herein in its entirety.

What is claimed is:

1. An information processing apparatus for transmitting a print command by using (a) a template including a data area in which contents data is input and (b) the contents data, comprising:
    a deciding unit configured to decide, based on the contents data, a start time of a post-printing process which is executed to printed matter formed based on the template and the contents data;
    a deriving unit configured to derive a print start time for starting printing by using the contents data and the template based on the start time of the post-printing process decided by the deciding unit and on the contents data;
    a selecting unit configured to select, from among a plurality of records having the same print start time, a record that requires a maximum data area;
    a changing unit configured to change a size of the data area in the template so that the contents data of the record selected by the selecting unit can be enclosed; and
    an instructing unit configured to instruct the printing based on the contents data and the template changed by the changing unit by using the print start time derived by the deriving unit.

2. An apparatus according to claim 1, further comprising a storing unit configured to previously convert the template into printable data and store it into a storing medium.

3. An apparatus according to claim 2, further comprising:
    an obtaining unit configured to obtain the record to be printed at the time derived by the deriving unit from a database when the time derived by the deriving unit has come;
    a converting unit configured to convert the contents data included in the record obtained by the second obtaining unit into the printable data;

a reading unit configured to read out the template into which the contents data converted by the converting unit is input from the templates held by the holding unit;

a synthesizing unit configured to synthesize the contents data converted by the converting unit to a data area of the template read out by the reading unit; and an output unit configured to output the data synthesized by the synthesizing unit.

4. An apparatus according to claim 2, further comprising:

a first output unit configured to output the template to be printed among the templates stored by the storing unit when the time derived by the deriving unit has come; and a second output unit configured to output information for accessing the record including the contents data which is input into the data area of the template to be printed.

5. An apparatus according to claim 1, further comprising:

a receiving unit configured to receive a request for the printing which is executed by inputting the record as electronic data which differs every original into a data area of a template as electronic data which is common to a plurality of originals from a client terminal apparatus; and a transmitting unit configured to transmit the print start time derived by the deriving unit to the client terminal apparatus.

6. An apparatus according to claim 5, further comprising a discriminating unit configured to discriminate whether or not post-printing process information is obtained based on information included in the print request received by the receiving unit, wherein when it is determined by the discriminating unit that the post-printing process information is obtained, an obtaining unit obtains the post-printing process information.

7. A print control method of transmitting a print command by using (a) a template including a data area in which contents data is input and (b) the contents data, comprising:

a deciding step of deciding, based on the contents data, a start time of a post-printing process which is executed to printed matter formed based on the template and the contents data;

a deriving step of deriving a print start time for starting printing by using the contents data and the template based on the start time of the post-printing process decided by the deciding step and on the contents data;

a selecting step of selecting, from among a plurality of records having the same print start time, a record that requires a maximum data area;

a changing step of changing a size of the data area in the template so that the contents data of the record selected by the selecting step can be enclosed; and an instructing step of instructing the printing based on the contents data and the template changed in the changing step by using the print start time derived by the deriving step.

8. A non-transitory computer-readable memory medium storing a computer program for allowing a computer to instruct printing by using (a) a template including a data area in which contents data is input and (b) the contents data, wherein program causes the computer to execute:

a deciding step of deciding, based on the contents data, a start time of a post-printing process which is executed to printed matter formed based on the template and the contents data;

a deriving step of deriving a print start time for starting printing by using the contents data and the template based on the start time of the post-printing process decided by the deciding step and on the contents data;

a selecting step of selecting, from among a plurality of records having the same print start time, a record that requires a maximum data area;

a changing step of changing a size of the data area in the template so that the contents data of the record selected by the selecting step can be enclosed; and an instructing step of instructing the printing based on the contents data and the template changed by the changing step by using the print start time derived by the deriving step.

* * * * *